Feb. 27, 1962 L. W. EIDEN ET AL 3,022,616
DOUGH PACKAGING APPARATUS
Filed April 22, 1959 7 Sheets-Sheet 1

INVENTORS
LEO W. EIDEN
STANLEY C. RUSTAD
PETER SMIRNOW
BY
William C. Babcock
ATTORNEY Feb. 27, 1962   L. W. EIDEN ET AL   3,022,616
DOUGH PACKAGING APPARATUS Filed April 22, 1959   7 Sheets-Sheet 2

FIG. 4

INVENTORS
LEO W. EIDEN
STANLEY C. RUSTAD
PETER SMIRNOW
BY
William C. Babcock
ATTORNEY Feb. 27, 1962 — L. W. EIDEN ET AL — 3,022,616
DOUGH PACKAGING APPARATUS
Filed April 22, 1959 — 7 Sheets-Sheet 6

FIG. 13

INVENTORS
LEO W. EIDEN
STANLEY C. RUSTAD
PETER SMIRNOW
BY
*William C. Babcock*
ATTORNEY

United States Patent Office 3,022,616
Patented Feb. 27, 1962

3,022,616
DOUGH PACKAGING APPARATUS
Leo W. Eiden, Stanley C. Rustad, and Peter Smirnow, Minneapolis, Minn., assignors to General Mills, Inc., a corporation of Delaware
Filed Apr. 22, 1959, Ser. No. 808,029
22 Claims. (Cl. 53—56)

The present invention relates generally to dough packaging apparatus and more specifically to a dough packaging machine for automatically forming and packing dough in a continuous operation.

In the packaging art, machines are known which form and package dough products, such as biscuits or rolls, in cans or containers. More recently, however, dough products have been developed wherein the dough is rolled into cylindrical columns and is purchased by consumers in individual cans or containers. Such products are often larger than the usual biscuit or roll and the problems connected with forming and packaging such products are somewhat greater.

The problems encountered are believed due in part to the nature of dough, i.e., its yieldable mass, its co-efficient of friction and its unpredictable nature or behavior under certain conditions. A particular problem which exists is that of dough proofing (rising) which frequently occurs shortly after the dough has been mixed. Because of the latter problem, it is important to form and package the dough products promptly, i.e., within the period prior to proofing, so that the dough does not rise to an extent which is sufficient to interfere with the forming and packaging operation.

Thus in view of the above it is one object of the present invention to provide an automatic dough packaging apparatus for continuously forming and inserting individual dough sections in cans or containers.

Another object of the invention is to provide an automatic dough packaging machine which will continuously form a sheet of dough into a plurality of cylindrical columns, will sever the columns into individual dough sections, will re-form the severed ends of the sections into a cylindrical configuration and will insert the sections into individual cans or containers.

Yet another object of the invention is to provide an automatic dough packaging machine in which the dough and dough sections formed therefrom are in a continuous state of movement during the forming and packaging operation.

A further object of the invention is to provide an automatic dough packaging machine wherein a movably mounted dough loading means is provided and is actuated by a dough section to deliver the dough section to a container.

A still further object of the invention is to provide an automatic dough packaging machine with interlock means for stopping the machine in the event a malfunction occurs during operation.

Further objects and advantages will become apparent in the following specification and the appended drawings in which.

Figures 1, 2, 3:
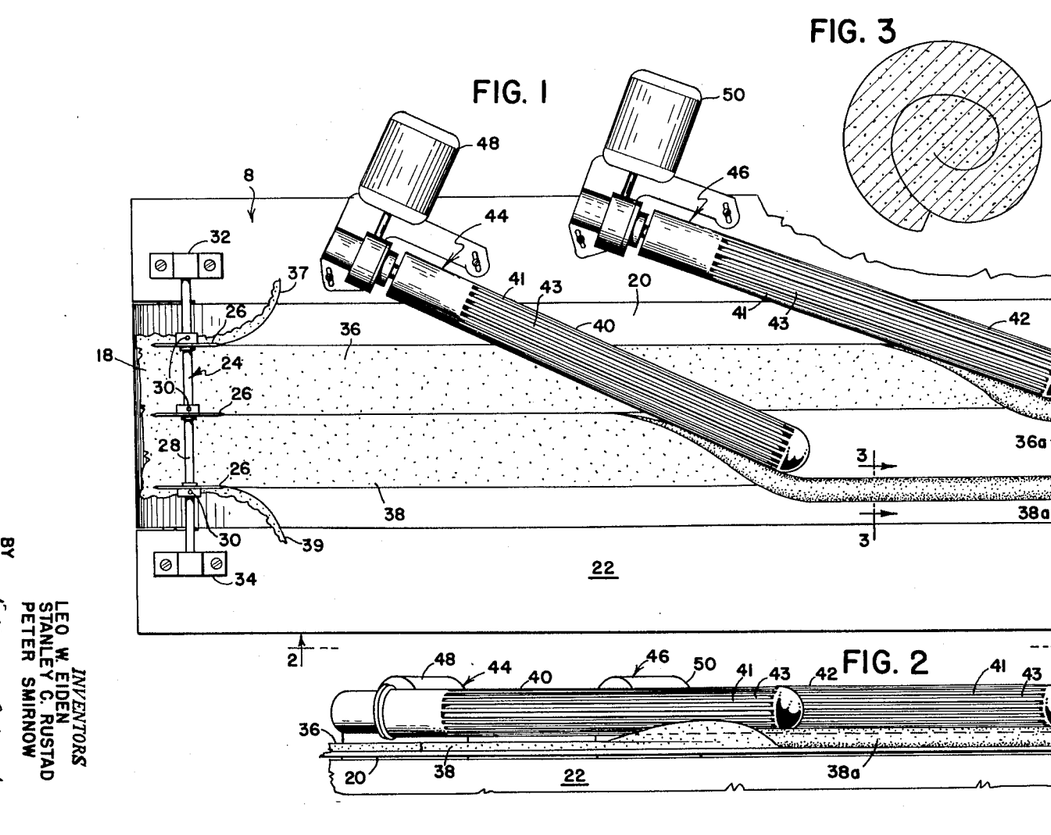
FIGURE 1 is a plan view of a portion of the dough packaging machine illustrating the cutting and forming of the dough sheet into cylindrically shaped columns.
FIG. 2 is a partial side elevational view taken generally along the line 2—2 of FIG. 1 further illustrating the manner in which the dough is formed into cylindrical columns.
FIG. 3 is a cross sectional view of one of the dough columns taken generally along line 3—3 of FIG. 1.
Figure 4:
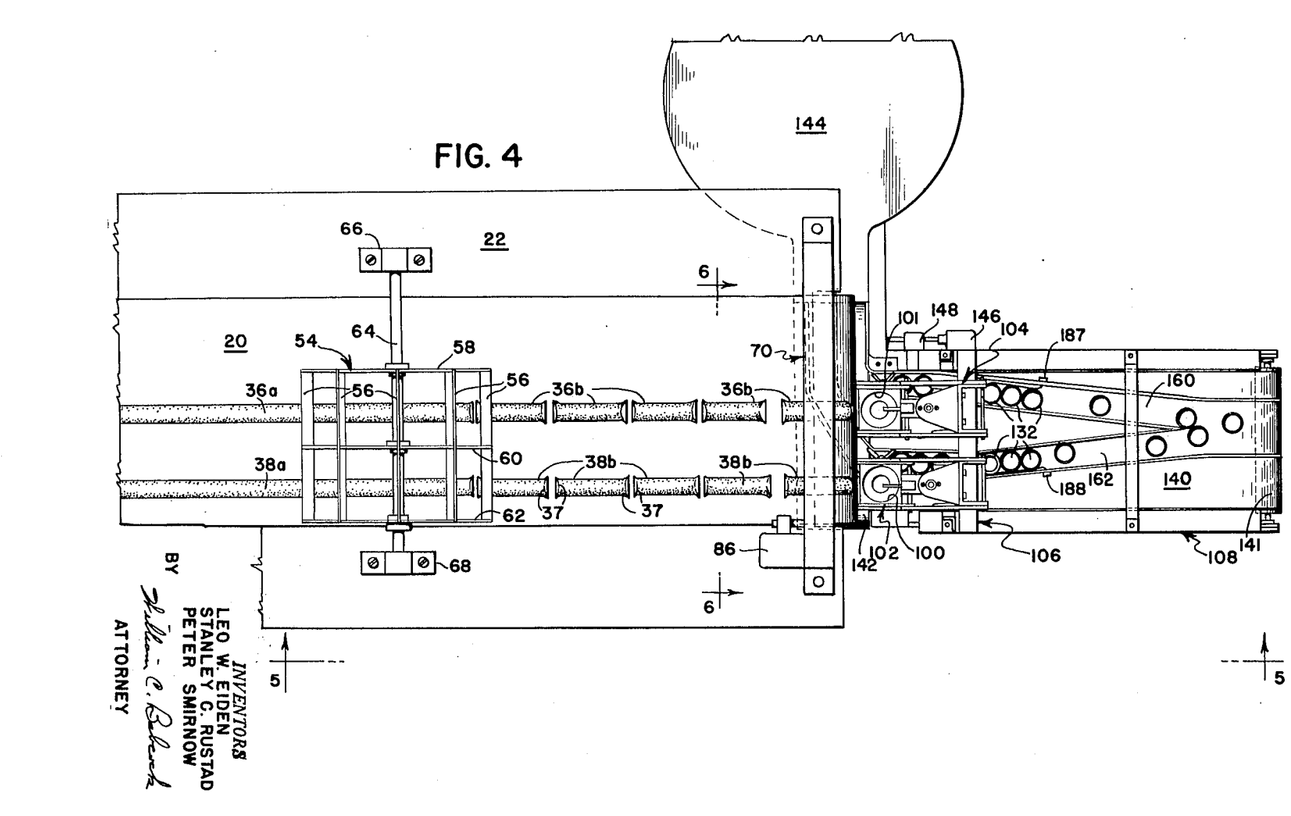
FIG. 4 is a plan view of a portion of the dough packaging machine illustrating the manner in which the columns of dough are formed into individual dough sections and delivered to the dough loading and can filling end of the machine.

Referring now to the preferred embodiment of the invention as seen in the combined plan views of FIGS. 1 and 4, the dough packaging apparatus 8 is provided with a conveyor 20 which is adapted to receive thereon a sheet of dough 18 from a standard sheeting machine (not shown).

The sheet of dough 18 can be coated with oil in known manner prior to being received on the conveyor 20 and is moved past a plurality of work stations along a production table 22 by the conveyor 20.

The sheet of dough 18 is initially engaged by a cutter assembly 24 provided with a plurality of endless cutters 26. The cutters 26 are equally spaced apart across the width of the conveyor 20 and are supported for rotation by a transverse shaft 28. The cutters 26 are secured to the shaft 28 by set screws 30 and the shaft in turn is supported for rotation by bearing posts 32 and 34 positioned on the production table 22 on opposite sides of the conveyor 20.

The cutters 26 contact the conveyor 20 and are actuated by the movement of the conveyor and the dough to form the sheet of dough 18 into a plurality of continuous strips 36 and 38. The cutters 26 likewise sever from the sheet of dough 18 any ragged edges such as 37 and 39 that are formed thereon during the sheeting operation.

The thickness of the sheet of dough 18 and the width of the continuous strips 36 and 38 are determined by the desired product size which in the present instance is slightly less than the size of the can or container at the time it is packaged. For example, the width of the strips 36 and 38 can be changed by loosening the set screws 30 and moving the cutters 26 to a new position along the shaft 28. Likewise, the thickness of the sheet 18 is controlled by the usual adjustment on the previously mentioned dough sheeting machine.

The conveyor 20 moves the continuous strips 36 and 38 into the path of angularly disposed cylinders 40 and 42 of roll winders 44 and 46. The roll winders 44 and 46 are driven by motors 48 and 50 and may be commercial type devices such as those manufactured by Anetsberger Brothers, Chicago, Ill. The cylinders 40 and 42 are driven in a clockwise direction (as viewed from their forward ends) by the motors 48 and 50 and are provided around their circumference with a series of lands and grooves 41 and 43 which engage the strips 36 and 38 rolling such strips upon themselves to form continuous cylindrical columns of dough 36a and 38a.

The dough columns 36a and 38a are formed continuously so long as the sheet 18 is continuous and as noted in FIG. 2 the thickness of the strips 36 and 38 is less than the vertical spacing between the lower surfaces of the cylinders 40 and 42 and the conveyor 20. Therefore, under normal conditions the strips would pass beneath the cylinders 40 and 42 and would not come in contact therewith as desired.

In the present instance, however, only the strip 36 is permitted to pass beneath the forwardmost cylinder 40 (FIG. 1) and when the machine is initially started the left corner of the end of each strip is manually folded upon the strip in a direction away from the cylinder when the end of the strip has been moved to a position adjacent its respective cylinder so that engagement with the lands and grooves 41 and 43 of the cylinder occurs. Once the engagement is made strips 36 and 38 are continuously rolled or formed into cylindrical columns of dough 36a and 38a by the cylinders 40 and 42.

The roll winders 48 may also be modified or mounted in a manner other than that shown in FIG. 2 to provide clearance for the strip 36. For example, the cylinder 40 can be mounted on an incline with respect to the top surface of the strip 36 to provide sufficient clearance therefor. Accordingly, a portion of the cylinder 40 immediately above the strip 36 can be devoided of lands and grooves to likewise provide the necessary clearance.

While only two roll winders are shown, substantially more than two can be employed and are feasibly possible provided adequate clearance is provided for each successive strip of dough. Other means can also be employed for forming the dough into similar cylindrical columns, i.e., extrusion processes, etc.

The dough columns 36a and 38a are next moved by the conveyor 20 into the path of a transverse cutter 54. The cutter 54 is generally circular in shape and is formed of disc shaped rib plates 58, 60 and 62 (FIGS. 4 and 5) which have positioned around their circumference radially extending cutter blades 56. The blades 56 are equally spaced apart around the rib plates 58, 60 and 62 and the rib plates in turn are supported on a shaft 64 which is journaled in its ends in bearing posts 66 and 68. The rib plates 58, 60 and 62 as well as the blades 56 contact the conveyor 20 and are actuated by the conveyor and dough to form the columns 36a and 38a into individual dough sections 36b and 38b. The cutter 54 in addition to being simple in construction automatically provides the same length between cuts regardless of the speed of the conveyor 20.

As will be realized at this point the length of the dough sections 36b and 38b is determined by the radial spacing between the blades 56 around the circumference of the rib plates. Likewise the spacing between the blades 56 will vary depending upon the desired product size and the container in which it is packaged.

Figure 5:
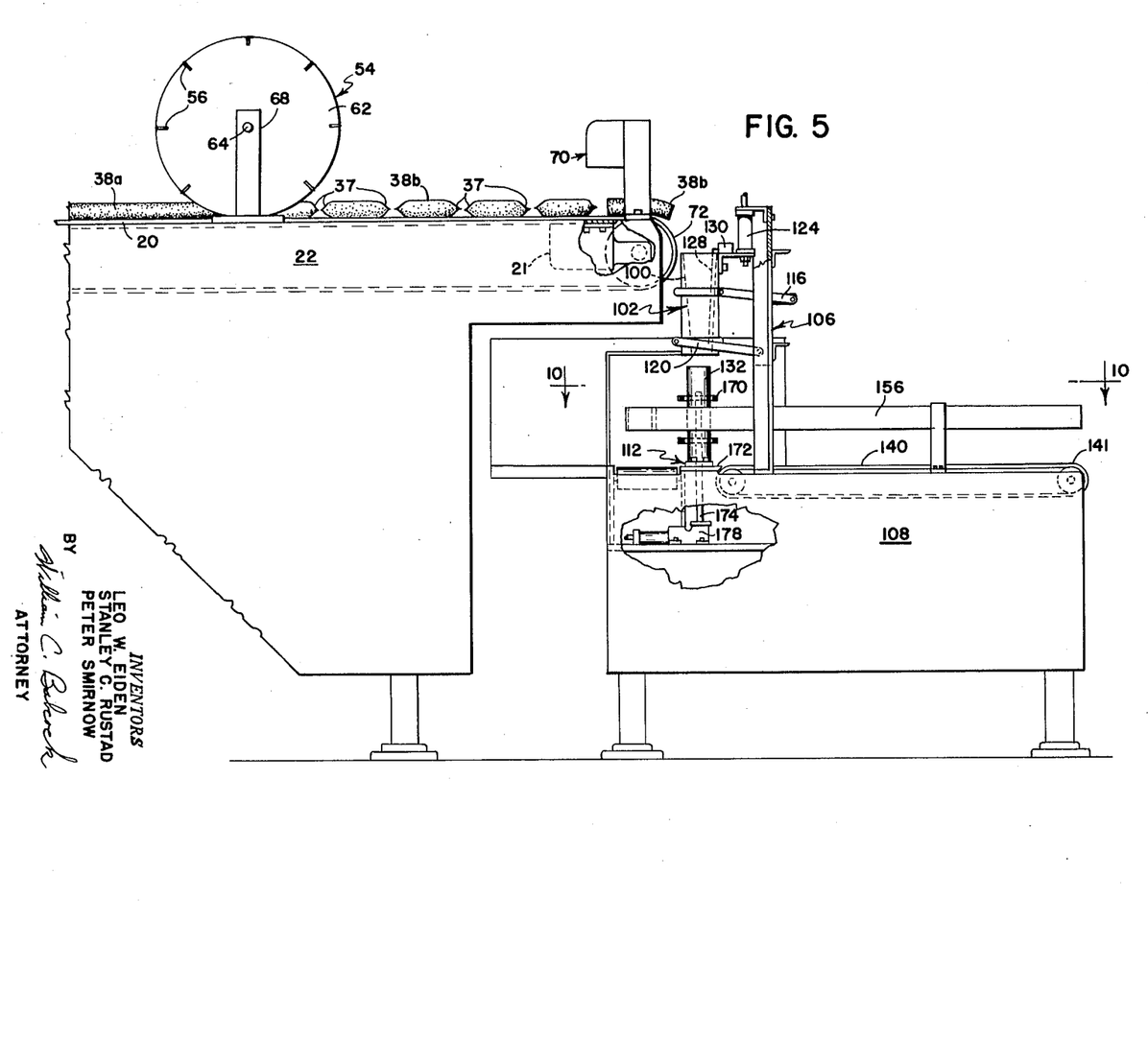
FIG. 5 is a side elevational view of the machine of FIG. 4 taken generally along line 5—5 of that figure.

Referring now to FIG. 5, as the cutter 54 is actuated by the conveyor 20 to form the columns 36a and 38a into individual sections 36b and 38b, the cutting edges of the blades 56 which are moderately sharp tend to pinch the dough forming pillow shaped ends 37. The pillow shaped ends 37 are generally undesirable since they can become tangled with the container when the sections are packaged. In order to obviate this effect the present device is provided with an orienting guide and shaping assembly 70 which is positioned adjacent the discharge end or transfer point 72 of the conveyor 20.

Figure 6:
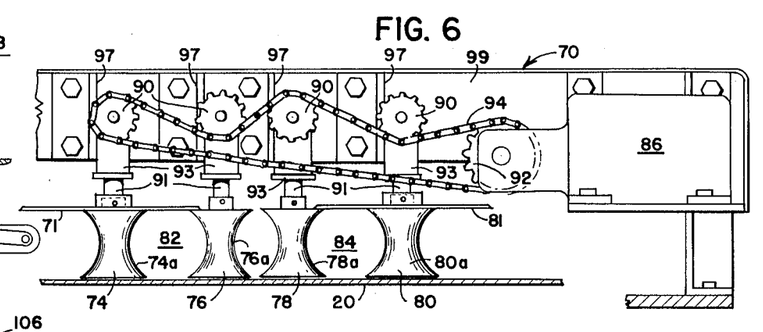
FIG. 6 is a front elevational view of the guide assembly taken generally along line 6—6 of FIG. 4.

The orienting guide and shaping assembly 70 is shown in detail in FIG. 6 and includes a plurality of vertically disposed rollers 74, 76, 78 and 80 positioned immediately above the conveyor 20 on drive shafts 91 of right angle gear drives 93. The rollers 74, 76, 78 and 80 are provided around their circumference with concave surfaces 74a, 76a, 78a, and 80a respectively and are laterally spaced apart to provide openings 82 and 84 each of which is in general alignment with one of the rows of dough sections 36b and 38b. For examples, rollers 74 and 76 by virtue of their concave surfaces 74a and 76a produce the opening 82 therebetween which is substantially the same as the desired circular cross section of the dough sections 36b which pass therethrough. Accordingly, concave surfaces 78a and 80a on rollers 78 and 80 provide an opening 84 therebetween which is likewise of the desired circular cross section of the dough sections 38b which pass therethrough.

The gear drives 93 are commercial devices well known in the art and are secured by angle members 97 to a supporting frame 99 and are actuated by a drive motor 86. The rollers 74, 76, 78 and 80 tend to orient and align each dough section with one of the dough transfer passages or apertures 100 and 101 of dough loading units 102 and 104 (FIG. 4) as the dough section passes through its respective opening. The rollers also reshape its pillowed ends 37 to a cylindrical configuration.

To drive these elements each roller is provided on its right angle gear drive 93 with a sprocket 90 which is engaged by a chain drive 94. The chain drive 94 is driven by a drive sprocket 92 on the motor 86 and extends around each of the sprockets 90 in such a manner as to rotate the inner opposed surfaces of each pair of rollers in the desired direction of dough movement. Since the dough sections 36a and 38a are in general alignment with the openings 82 and 84 as previously described, they pass through the openings 82 and 84 and are oriented and reshaped into continuous cylinders of dough. Therefore by providing the orienting guide assembly 70 the dough sections 36b and 38b emerge therefrom in a more perfect form for inserting in a container.

In order to further assure uniformity of the sections 36b and 38b substantially flat plates 71 and 81 are attached to the top surfaces of rollers 70 and 80 and rotate therewith to prevent the dough sections from being squeezed out of the top of the openings 82 and 84 as they pass therethrough. Similarly, the plates 71 and 81 overlap the top surfaces of rollers 76 and 78 and are in such close proximity therewith that the dough sections 36b and 38b cannot squeeze past the top of the rollers.

Figure 7:
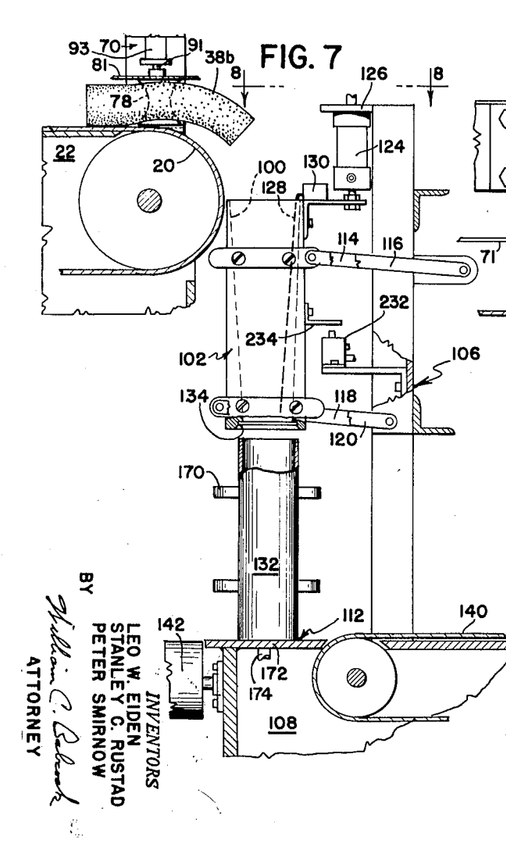
FIG. 7 is an enlarged partial side elevational view of one of the dough loading units of FIG. 4 illustrating the position of the funnel member in a raised position.
Figures 9, 11, 12:
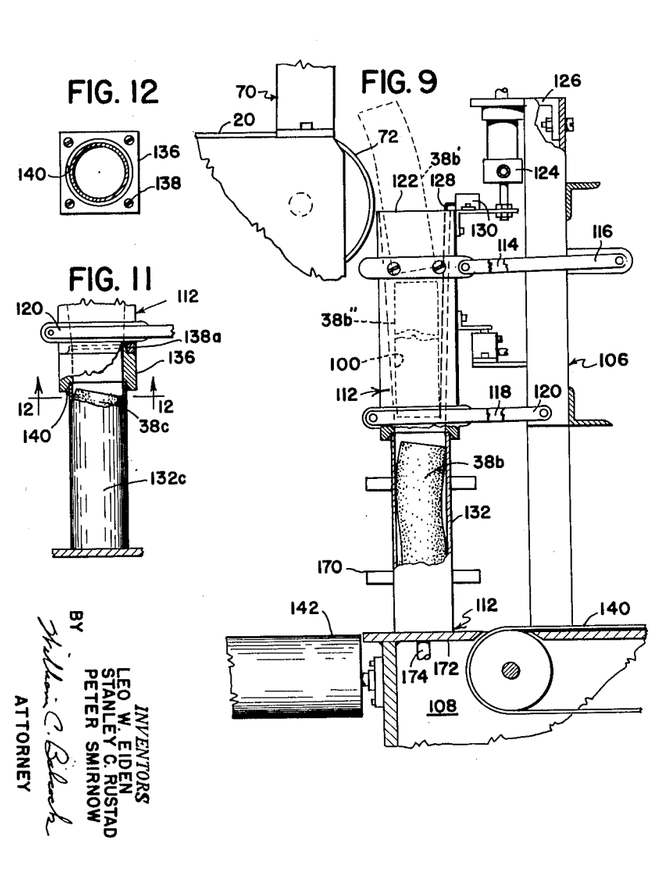
FIG. 9 is a side elevational view of the dough loading unit of FIG. 7 illustrating the movement of a dough section through the funnel member and showing the funnel member in a lowered position with respect to a container.
FIG. 11 is a partial side elevational view of the dough loading unit of FIG. 9 showing an adapter secured to the lower end of the funnel member.
FIG. 12 is a sectional view taken generally along line 12—12 of FIG. 11 illustrating the manner in which the adapter is attached to the funnel member.

The speed of the rollers 74, 76, 78 and 80 is such as to pull the dough roll-ups through the openings 82 and 84 at a slightly higher speed than that of the conveyor 20 in order to better separate the sections of dough as they leave the end 72 of the conveyor. The orienting guide and shaping assembly 70 is mounted close to the transfer point or discharge end 72 of the conveyor and has a tendency to slightly lift or pick up each dough section away from the conveyor as it is fed through one of the openings 82 and 84. Upon passing through the opening, the dough section is deposited in the top of its respective funnel substantially clear of the conveyor 20 (FIGS. 7 and 9).

The dough loading units 102 and 104 are identical in construction and are supported by an upright frame 106 positioned above a can feed table 108. The dough loading units 102 and 104 are mounted for reciprocation to and from can filling stations 110 and 112 (FIG. 10) and are actuated by the movement of a dough section from the discharge end or transfer point of the conveyor to deliver the dough section to a container at their respective filling stations. Since the dough loading units 102 and 104 are identical in construction only the dough loading unit 102 will be described in detail. This unit is seen more specifically in the drawings of FIGS. 7, 8, and 9.

The dough loading unit 102 includes a vertically disposed hopper 112 movably mounted on a frame 106 by connecting arms 114, 116, 118 and 120 pivotally mounted to the hopper and the frame. Thus the hopper is vertically movable between an upper and a lower position. The top 122 of the hopper 112 in its upper position is in close proximity with the conveyor 20 and is provided along its vertical axis with the previously mentioned dough transfer passage in the form of a tapered aperture or funnel 100. The tapered aperture 100 extends through the hopper 112 with a dough receiving opening at the top of the hopper and a dough discharge opening at the bottom, and the hopper is provided vertical reciprocation by operating means, including an air cylinder 124 mounted at its upper end 122. The air cylinder 124 is supported on the frame 106 by a bracket 126 and its piston is attached to the hopper 112 by an L-shaped bracket 129. The air cylinder 124 provides downward vertical movement to the hopper 112 in response to the actuation of a microswitch contact arm 128 that extends into the aperture 100 as a control means or sensing member. The contact arm 128 is actuated by a dough section upon entering the aperture 100, and thus energizes microswitch 130.

While the means for operating the machine is described further in the specification it should be noted at this time that when the microswitch 130 is energized by the dough section 38b it initiates a chain of events which cause the hopper 112 to deliver the dough section 38b to the container 132 at the filling station 112. For this purpose, as shown in FIG. 11, the lower discharge opening of the dough transfer passage has a cross section essentially the same as the inside diameter of the container. The aperture of the hopper 112 is also provided in its lower end with a can register 134 of substantially the same internal diameter as the outside diameter of the top of the container 142 and when actuated by the air cylinder 124 the register 134 is engaged with the container 132 to guide the dough section during its delivery thereto. As the register 134 engages the container 132 the piston of the air cylinder 124 reaches the extent of its lowermost travel and the hopper 112 comes to an abrupt stop, providing a snap action which allows the velocity of the dough to be influential in delivering the dough section out of the hopper and into the container. Additionally, the register obtained with the container provides an uninterrupted passage or smooth surface all the way into the container with no edges to impede the forward motion of the dough section into the container.

The diameter of the dough section 38b is less than the smallest diameter of the aperture 100 and upon entering the aperture passes freely therethrough as shown in FIG. 9. During the passage of the dough section 38b through the opening or aperture 100 the contact 128 of microswitch 130 is continuously depressed as the dough section 38b passes therethrough (see dotted positions 38b' and 38b''). The dough section, however, upon entering the container 132 releases the contact arm 128 of microswitch 130 and a new chain of events is established in the operating system, which cause the air cylinder 124 to return to the hopper 112 to its normal position generally near or slightly below the central axis of the conveyor 20.

The location of the hopper is such that in its upper position the bottom of the hopper has ample clearance with the top of the container at the filling station 112 and allows the container to be indexed to and from the filling station 112 even if a dough section should by chance project slightly beyond the top surface of the container. Such spacing also provides room for an operator to manually remove a dough section should the section jam on its way to the container.

Figure 8:
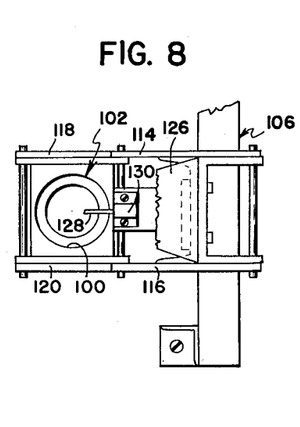
FIG. 8 is a plan view of the dough loading unit of FIG. 7 as viewed along line 8—8.

While in FIGS. 7, 8, and 9 the hopper 112 is shown as being adequate for a filling container such as 132 the hopper 112 may also be modified as shown in FIGS. 11 and 12 to make it suitable for packaging dough sections of a less extent or smaller mass than that of the dough section 38b.

For example, as previously stated, it is desirable under certain conditions to package dough sections having a different size or mass. As seen in FIG. 11 a smaller dough section is shown which has been given the numeral designation 38c. The dough section 38c is accordingly packaged in a container 132c which is somewhat smaller than the previous container 132. In order to package the dough section 38c in the container 132c a longer hopper can be employed or an adapter such as the one shown in FIGS. 11 and 12 can be used. The adapter 136 is easily attached to the lower end of the hopper 112 such as by screws 138. The adapter 136 is accordingly provided with a mating tongue 138a and with a register 140 in its lower end which engages the top surface of the can 132c in the same manner as previously described in regard to the register 134 of the hopper 112. The tongue 138a accordingly mates with the register 134 of the hopper 112 and provides a smooth bore through which the dough section will travel.

In the above manner the hopper 112 can be modified to package dough sections such as 38c which are shorter than the dough sections 38b or which are to be packaged in containers of different length as determined by the presence or absence of other ingredients. In actual practice the dough loading unit 104 would likewise be provided with an adapter such as 138 in order to load dough sections of a similar size. It is also possible to have hoppers of a different size which are easily interchanged depending upon the size of the dough section to be packaged.

Figure 10:
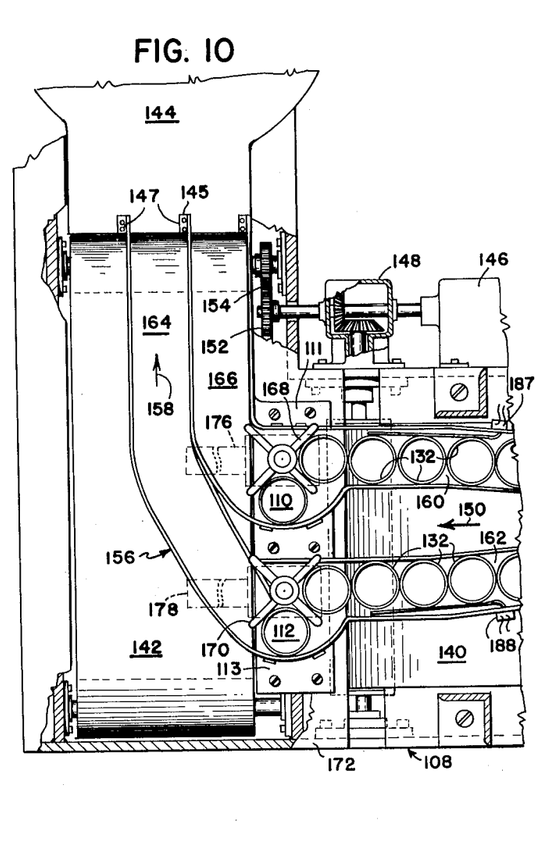
FIG. 10 is a partial plan view taken generally along line 10—10 of FIG. 5 illustrating the can feed indexing means.

Returning now to the can feed table 108. The can feed table 108 as seen in FIGS. 4 and 10 includes a can feed conveyor 140, a can feed discharge conveyor 142 and a can orienting device 144 adjacent the discharge end 141 of the conveyor 142. The can feed conveyor 140 is drive by a motor 146 which drives through a right angle gear drive 148 to move the conveyor 140 in the direction of the arrow 150 toward the can filling stations 110 and 112. The motor 146 accordingly drives a pinion 152 to rotate a gear 154 on the can feed discharge conveyor 142 to move the conveyor in the direction of arrow 158 toward a turn table or can orienting device 144.

The turn table or can orienting device 144 is not herein shown or described in detail but is of known type which re-orients the filled containers prior to their entrance to a capping machine (not shown).

As seen in FIGS. 4 and 5 the can feed table 108 is provided superjacent the conveyors 140 and 142 with a vertically disposed can guide 156. The can guide 156 is formed of sheet metal strips which provide channels 160 and 162 into which the containers 132 are channeled as they move along the conveyor 140 toward the filling stations 110 and 112. The can guide 156 is attached to the orienting device 144 by a bracket 147 and screws 145 to the can feed table 108. The strips of metal which form the can guide 156 extend around the filling stations 110 and 112 and provide additional channels 164 and 166 above the discharge conveyor 142 to channel the filled containers away from the filling stations 110 and 112. The can guide 154 is additionally supported adjacent the can filling stations by brackets 111 and 113.

Thus empty containers admitted to the can feed conveyor 140 at its inlet end 141, are channeled through the channels 160 and 162 to the turnstiles or indexing wheels 168 and 170 at the filling stations 110 and 112. After being filled the containers are indexed by the indexing wheels onto the discharge conveyor 142 and are moved by the conveyor to the turn table 144.

In the above description the can guide 156 is shown and described as being somewhat suitable for use with the present invention. In a more general application, however, it is highly feasible to employ the use of a reciprocatory or vibratory device in conjunction with or in lieu of the can guide 156; such a device is shown in a co-pending U.S. patent application of the assignee, Serial No. 736,164

The indexing wheels 168 and 170 are identical in construction and are designed to engage the containers 132 and index them to and from their respective filling stations during the can filling operation. The indexing wheels 168 and 170 are indexed 90° each time a dough section is delivered to a container and when indexed their indexing arms engage an empty container to move it into filling position and simultaneously index the filled container onto the discharge conveyor 142.

As will be noted in FIG. 5 when a container 132 is positioned at a filling station such as 112 it is supported on a plate 172, the transverse longitudinal edge of which is somewhat lower than the forward top edge of the conveyor 140 which delivers the container thereto. By positioning the plate 172 in this manner the indexing wheels freely index the containers 132 onto the plate 172. Likewise when the container has been filled, the opposite edge of the plate 172 is generally higher than the top surface of the conveyor 142 and the filled container is therefore indexed onto the conveyor without striking its longitudinal edge.

The indexing wheels 168 and 170 are secured by shafts 174 (only one is shown) to dial feed indexing tables 176 and 178 which may be of the type manufactured by A. K. Allen Company, Brooklyn, New York. Such indexing tables 176 and 178 are connected to a pneumatic system (FIG. 14) and are actuated (as will be described further in the specification) to provide movement to the indexing wheels 168 and 170.

Figure 13:
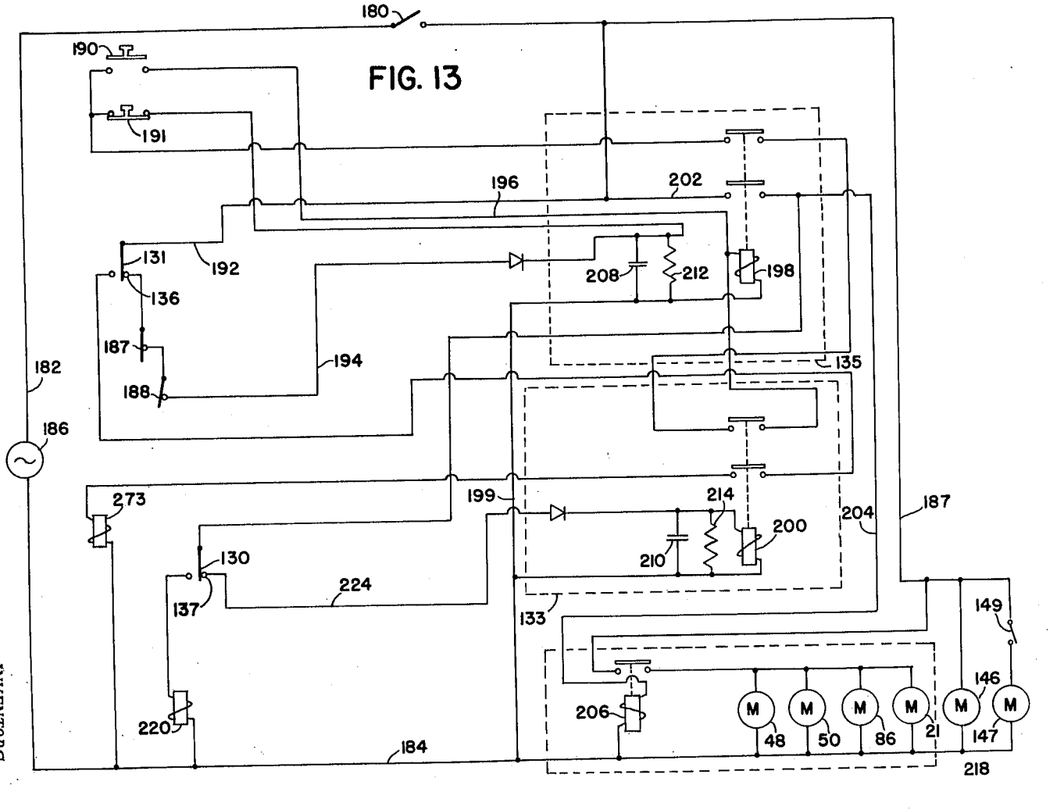
FIG. 13 is a schematic view of the electrical system of the machine.
Figure 14:
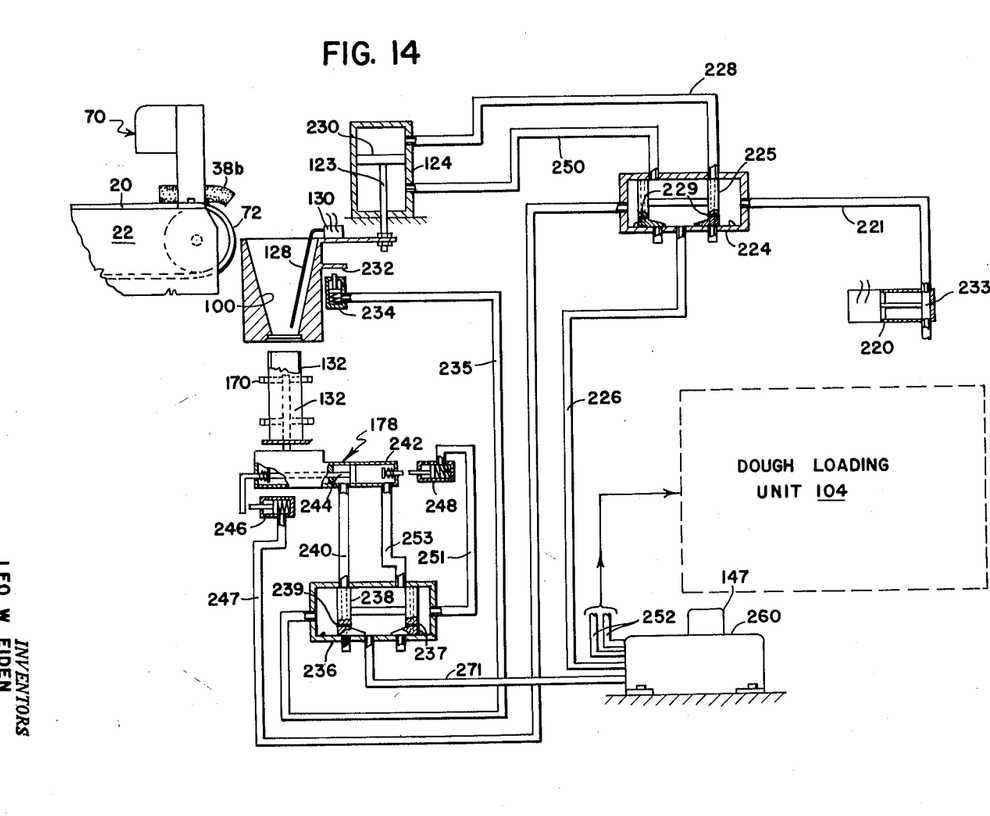
FIG. 14 is a diagrammatic view of the pneumatic system of the machine.

Turning now to the over-all operation of the machine with specific reference to FIGS. 13 and 14. The machine 8 is controlled through the electrical circuit of FIG. 13 which includes an electrical source 186. A normally open control switch 180 is connected by lead 182 to the source 186 and when closed completes a connection through lines 184 and 187 to the can feed motor 146 and a compressor motor 147 (provided a compressor switch 149 is closed). The can feed motor 146 actuates the can feed conveyor 140 and, provided a supply of containers is available at its inlet end 141, delivers them into the channels 160 and 162. The compressor switch 149 is of a known type which allows the compressor 260 to maintain a pressure build-up sufficient to operate the pneumatic system of FIG. 14 (when switch 180 is closed).

The containers 132 may be the type with or without liners (shown without liners for simplicity) and upon entering the channels 160 and 162 engage the contact arms of microswitches 187 and 188 (FIG. 10) which project into the path of the containers as they move through the channels. The microswitches 187 and 188 are connected as shown in the circuit of FIG. 13 in such a manner that the circuit cannot be completed to operate the rest of the machine unless the switches 187 and 188 are closed indicating that containers are available and ready to be filled. An operator, upon visually observing that containers are present in the chutes 160 and 162 closes a momentary contact switch 190 admitting current through lines 192, 194 and 196 to relays 198 and 200 to a time delay circuit described below. The relays 198 and 200 are connected in parallel and provide an electrical interlock system which stops the machine if the dough sections are not properly delivered to the containers at the filling stations.

When the relays 198 and 200 are energized, current passes through line 204 to a heavy duty motor control relay 206 in the motor control circuit 218 to actuate the roll winder motors 48 and 50, the guide assembly motor 86, and the main conveyor motor 21. At this time the machine is in operation except for the sheet of dough 18 which has not yet been admitted to the inlet end of the conveyor 20.

The sheet of dough 18 is admitted to the inlet end of the conveyor 20 adjacent the cutters 26 and the roll winders 44 and 46. The operator allows the machine to continue its operation until the forward end of the sheet of dough has moved to a position adjacent the forwardmost roll winder 44 and at that time a normally closed on-off switch 191 is opened by the operator, stopping the machine. The operator then folds the end of the strip of dough 48 over upon itself as previously described so that it engages the cylinder 40 of roll winder 44. The on-off switch 191 is again closed, placing the machine in operation and the forwardmost roll winder 44 forms the strip 38 into the continuous column of dough 38a while the strip 36 continues beneath the roll winder 44 until its forwardmost end is in a position adjacent the cylinder 42 of roll winder 46. Once the end of the strip 36 has passed beneath the cylinder 42 of roll winder 46, its edge is manually folded over upon itself as previously described so that the strip of dough is engaged by the cylinder 42. While the machine 8 can be stopped while the ends of the strips 36 and 38 are folded over, a skilled operator may accomplish the same while the machine is in operation.

The roll winders 44 and 46 form the strips 36 and 38 into continuous columns 36a and 38a and since the cutter assembly 54 is actuated by the conveyor, the dough sections 36b and 38b are continuously formed as the dough is moved along the conveyor 20. Likewise the dough sections are continuously passing through the orienting device 70 and are moving over the end 72 of conveyor 20 entering the funnel shaped apertures 100 and 101 of the dough loading units 102 and 104.

The dough sections 36b and 38b are generally spaced apart upon leaving the orienting device 70 and enter the apertures 100 and 101 in rapid succession tripping the contact arms of their respective microswitches 130 and 131. The microswitches 130 and 131 are two position type switches and are connected to individual electronic time delay circuits 133 and 135 (FIG. 13).

The delay circuit 133, includes the relay 200 which is connected in series with a condenser 210 and a resistor 214. The circuit 135 is similarly comprised of the relay 198 which has connected in series therewith a resistor 212 and a condenser 208. The delay circuits 133 and 135 are connected in parallel with each other and as will become apparent in the ensuing description are periodically energized by the movement of the dough sections to continuously maintain the completed circuit of FIG. 13.

The above arrangement has specific utility in that the dough sections 36b and 38b are delivered individually to the containers 132 at the filling stations 110 and 112 well within the time period required to discharge the condensers 208 and 210. When properly delivered to the containers 132 each dough section releases the contact arm of its respective microswitch allowing it to again energize its respective condenser. If a dough section is not properly delivered to a container or is halfway inserted in the container the contact arm is not released and therefore cannot return to its respective contact in time to re-energize its delay circuit. Therefore if a dough section is not delivered by either of the dough loading units 102 or 104 their respective delay circuits will be deenergized, releasing their respective relay stopping the machine.

While the above system provides effective electrical interlocks, further interlocks are included in the pneumatic system of FIG. 14 which operate in conjunction with the above to provide additional control over the functioning of the machine. Such combination in essence provides an electro-pneumatic system which controls the over-all operation of the machine.

As the dough section 38b leaves the end 72 of the conveyor 20 tripping the microswitch 130, a solenoid valve 220 is energized causing a plunger 233 to retract and exhaust air from an upper air cylinder control valve 224 through line 221. As the air is exhausted from the right end of the control valve 224 the valve plunger shifts to the right in FIG. 14 and air is thus admitted from a compressor 260 through lines 226 and 228 to the top of the air cylinder 124. The air admitted to the air cylinder 124 causes its plunger 230 to move the hopper 112 downward into engagement with a container at the filling station 112. As the hopper 112 moves downward into engagement with the container 132 a lug 232 on the hopper depresses a plunger in a bleed valve 234 exhausting air through line 235 from the left side of an indexing table control valve 236. This causes plunger 238 of valve 236 to move to the left, due to a small amount of air pressure which had previously bled through a small orifice 237 in the right side of plunger 238.

As the plunger 238 moves to the left, line 271 from the compressor 260 is opened and air is admitted through the valve 236 and line 240 to the left side of an air cylinder 242 on the indexing table 178. The air pressure admitted to the air cylinder 242 causes its piston 244 to move to the right, opening a bleed valve 246 which is connected by line 247 to the left side of the previously mentioned upper air cylinder control valve 224. Similarly, the movement of the piston opens a bleed valve 248 connected by line 251 to the right side of the indexing table control valve 236. Since pressure was previously exhausted from the left of the plunger 238 of valve 236, nothing happens and the plunger 238 remains in the same position. Likewise, air was previously exhausted from the right side of the valve 224 by the solenoid valve 220 and since the pressures are equal on opposite sides of the plunger 225, no plunger movement results. While the above action is occurring the dough section 38b is passing through the aperture 100 and is maintaining contact with the microswitch contact arm.

By the time the above described action is accomplished, which is almost instantaneous, the dough section 38b has passed into the container 132 and the microswitch contact arm 128 is released, de-energizing the solenoid valve 220 and causing its plunger 233 to close the exhaust line 221 from the valve 224. In other words each microswitch serves a dual purpose to control its respective solenoid and to act as a control point in the interlock system of the machine. As will be noted from the drawings, each valve is provided with small bleed openings such as 229 (of valve 224) and 239 (of valve 236). Likewise exhaust openings 229 and 241 are provided for venting the exhausting air from the valves 224 and 236 when a relative shifting of their plungers occur.

During the time that air pressure is admitted to the air cylinder 242 of the indexing table 178 and the upper air cylinder 124, air has been bleeding through the openings 229 and 239 to the opposite sides of the plungers 238 and 225. However, the amount of air which was bleeding through the openings 229 and 239 did not cause relative movement of the plungers 225 and 238 since the air was being bled to atmosphere. However, with the closing of the solenoid valve 220 and with the bleed valve 246 remaining open, the pressure build-up on the right side of the plunger 225 becomes sufficient to move the plunger to the left side of the valve 224, causing the air previously admitted to the top of the air cylinder 124 to be admitted through line 250 to the bottom of the plunger 230 and thus causing the air cylinder 124 to return the hopper 112 to its uppermost position. However, as will be realized the valves 224 and 236 provide an effective interlock which will not allow the hopper 112 to rise unless the dough section has released the contact 128.

Additionally, the hopper 112 will not rise, even though the dough has released the microswitch contact 128 until the piston in the indexing table air cylinder has moved all the way to the right, opening bleed valve 248. This also means that bleed valve 234 on the hopper cannot be opened until the hopper rises or piston 244 has traveled all the way to the right. In other words the piston 244 cannot start the indexing stroke to the left until it has compressed the cocking stroke to the right. Therefore, a dough section cannot be improperly delivered to a container at a filling station without stopping the machine.

As the hopper 112 returns to its uppermost position, the lug 232, which had previously engaged the plunger of bleed valve 234 releases the plunger so that air is no longer exhausted from the left side of the plunger 238 of the valve 236. Since the bleed valve 234 has been released by the lug 232, a pressure build-up occurs on the left side of the plunger 238 by virtue of the opening 239 and since the right side of the plunger 238 is still exhausting through bleed valve 248, the pressure build-up is sufficient to move the plunger 238 to the right, admitting air through lines 253 and 271 to the right side of the piston 244 of air cylinder 242 on the indexing table 178. Such air pressure causes the piston 244 to move away from the bleed valves 248 and 246, at which time the indexing table 178 is actuated by the movement of the plunger 244 and indexes the now filled container 132 away from the filling position 112, such movement of the indexing table 178 accordingly indexing an empty container into filling position. The indexing action of the indexing table is not described in specific detail since such tables are available as commercial items. Generally speaking, however, the table is indexed 90° each time the piston 244 is moved to the left and is cocked and readied for indexing as the piston 244 is moved to the right.

The above sequence of operation is identical for each of the dough loading units 102 and 104 and each unit is provided with the equivalent components. For example, lines 252 and 254 are indicated by the arrow 256 as terminating at the dough loading unit 104 which is shown in dotted outline. Therefore, the dough loading unit 104, is actuated in the manner previously described each time a dough section 36b leaves the end 72 of the conveyor 20. In other words the dough section 36b enters the aperture 101, trips the microswitch 131 and energizes a solenoid valve 273 (FIG. 13) to actuate the pneumatic system of the dough loading unit 104.

In the above specification a disclosure of the principles of the invention is presented together with some of the embodiments by which the invention can be carried out.

We claim:

1. In a dough packaging apparatus the combination including, movable means for feeding a sheet of dough continuously along a prescribed path, means for forming said sheet into a plurality of continuous cylindrical columns of dough, a movable cutter means to sever said columns into individual sections of dough, said cutter means forming pillow shaped ends on said sections during said severing, an orienting guide means adjacent said movable means for re-forming said pillow shaped ends to the cylindrical configuration of said dough sections, a transfer station at one end of said movable means adjacent said guide means, a dough loading means adjacent said transfer station, said dough loading means provided with a plurality of vertically reciprocal hopper means for receiving said dough sections successively from said transfer station, a plurality of filling stations one below each of said hopper members, supply means for supplying containers successively to each of said filling stations, a fluid pressure source means, a fluid pressure actuator for causing vertical movement of each of said hopper members, a control valve means for each of said actuators, each said control valve means connected to its respective actuator and to said fluid pressure source, an electrically operated valve means connected to each of said control valves, a circuit means provided with a switching means on each of said hopper members, each switching means connected to one of said electrically operated valving means and actuated by a dough section when said section is received by said hopper member at said transfer station, said actuation causing said actuator means to move said hopper into engagement with a container at its filling station, said movement delivering said dough section through said hopper member to said container.

2. The device of claim 1 wherein said supply means includes a movable conveying means, a motor means in said circuit for causing movement of said conveying means, a can guide means above said conveying means for guiding a supply of containers to each of said filling stations, switching means in said circuit associated with said can guide means, said switching means actuated by said containers to operate said motor means, and whereby the absence of said containers in said channels de-energizes said circuit to stop said machine.

3. The device of claim 1 wherein an indexing means is provided adjacent each of said filling stations for indexing said containers to and from said filling stations, a fluid pressure actuator means on each of said indexing means, each said actuator means connected to an indexing valve control means, each valve control means connected to one of said actuator control valve means and to said fluid pressure source and causing one indexing movement of its respective indexing means to index a filled container away from its filling station and empty container to said filling station in response to a first and a second condition, said first condition being the delivery of a dough section by said hopper member to a container at its filling station, said second condition being the return of said hopper to a position adjacent said transfer station by said fluid pressure actuator means.

4. In a dough packaging machine the combination including movable means for continuously feeding a sheet of dough along a prescribed path, means actuated by said movable means to form said sheet of dough into a plurality of continuous strips, forming means adjacent said movable means for engaging each of said strips to form them into continuous columns of dough, cutter means actuated by said movable means and forming each of said dough columns into individual sections of dough, a transfer station at one end of said movable means, a first and second dough loading means movably mounted adjacent said transfer station each in general alignment with at least one of said rows of dough sections, a filling station adjacent each of said dough loading means for positioning a container below each of said dough loading means, an aperture in each of said dough loading means above said containers, a power means for causing movement to each of said dough loading means, a switching means on each of said dough loading means, said switching means connected to a circuit means for independently actuating the power means of its respective dough loading means to move said dough loading means between a first position in which a dough section is received in said aperture at said transfer station and a second position in which said section is delivered through said aperture to said container, and a time delay means in said circuit for de-energizing said circuit when a dough section is not delivered by each of said dough loading means to their respective containers within a prescribed time period.

5. The device of claim 4 wherein said time delay means includes a delay circuit for each of said dough loading means, said circuits connected in parallel and energized by the switching means of the respective dough loading means to maintain the operation of the machine.

6. In a dough packaging apparatus, the combination including, means for supplying dough sections successively to a transfer station, a filling station for positioning a container below said transfer station, means for moving a plurality of containers successively to said filling station, a dough loading means supported by a frame member adjacent said transfer station, said dough loading means positioned above said filling station and spaced apart from a container at said transfer station, a tapered aperture in said dough loading means, said aperture having a diameter no greater than the inside diameter of said container at its end nearest the container, a register in said dough loading means at its end nearest the container, said register being concentric with the aperture in said hopper and having a diameter slightly greater than the outside diameter of the container, a dough loading actuator means on said frame and connected to said dough loading means, a circuit means provided with switching means for actuating said actuator means to cause movement of said dough loading means between said transfer station and the container in response to receiving a dough section in said aperture at said transfer station, said movement engaging the register with said container to deliver said dough section thereto.

7. The device of claim 6 wherein said dough loading means includes a vertically disposed hopper provided with an upper and a lower hopper section and wherein said lower hopper section is detachable from said upper hopper section.

8. The device of claim 7 wherein means is provided for attaching said lower hopper section to said upper hopper section and wherein said register is in said lower hopper section.

9. In a dough packaging apparatus the combination including a motor driven conveyor means for supplying similar dough sections successively to a transfer station, a circuit means operatively connected to said motor driven conveyor means, a movably mounted dough loading means supported by a frame member adjacent said transfer station, a pressure responsive indexing means at a filling station below said dough loading means and connected to a pressure source, a motor driven container supply means in said circuit for supplying containers successively to said indexing means, a pressure responsive power means on said frame member, said pressure responsive power means connected to said dough loading means and said pressure source, a switching means in said circuit and located on said dough loading means, a solenoid valve in said circuit and operatively connected to said pressure source, said switching means causing said solenoid valve to actuate said pressure responsive power means in response to the receiving of a dough section by said dough loading means at said transfer station to move said dough loading means between a first position in close proximity with said transfer station and a second position in which said dough loading means comes to an abrupt stop at said container to deliver said dough section thereto.

10. In a dough packaging apparatus the combination including movable means for supplying dough sections successively to a transfer station, a reciprocably mounted dough loading means adjacent said transfer station, an indexing means for moving successive containers into a filling position below said dough loading means, means for supplying containers successively to said indexing means, a power source, a first power means connected to said source and said dough loading means, a second power means connected to said source and said indexing means, an indexing actuator means adjacent said dough loading means, a switching means operatively connected to said first power means and said source, said switching means actuated in response to the receiving of a dough section by said dough loading means at said transfer station to actuate said second power means for moving said dough loading means between a first position at said transfer station and a second position at said container, said movement delivering said dough section to said container and engaging said dough loading means with said indexing actuator means to prepare said indexing means for further indexing.

11. In a dough packaging apparatus the combination including a circuit means, a motor driven conveyor in said circuit means for supplying similar dough sections successively to a transfer station, a reciprocably mounted dough loading means adjacent said transfer station, a fluid actuated indexing means provided with a container below said dough loading means, a motor driven supply conveyor in said circuit for providing a supply of containers successively to said indexing means, a fluid pressure source, a first fluid actuator means connected to said source and said dough loading means, a second fluid actuator means connected to said source and said indexing means, an indexing valve means adjacent said dough loading means, a switching means operatively connected to said circuit and said fluid pressure source, said switching means actuated in response to the receiving of a dough section by said dough loading means at said transfer station to energize said first fluid actuator means to move said dough loading means between a first position at said transfer station and a second position at said container, said movement delivering said dough section to said container and engaging said dough loading means with said indexing valve means to prepare said indexing means for future indexing.

12. In a dough packaging apparatus the combination including a movable means for feeding similar dough sections successively to a transfer station, a movably mounted dough loading means adjacent said transfer station for receiving said dough sections from said transfer station, a container supply means for supplying containers successively to a filling station below said dough loading means, a fluid pressure means including a hopper actuator means for causing movement of said dough loading means between said transfer station and a container at said filling station, a circuit means including a switching means for causing said actuation in response to the actuation of said switching means by a dough section when received by said dough loading means at said transfer station, an indexing means at said filling station and including an indexing actuator means in said fluid pressure means for indexing said container means away from said filling station in response to a first and a second condition in which said dough section is delivered to said container means and said dough loading means is returned to a position adjacent said transfer station.

13. A conveyor means for feeding similar dough sections successively to a transfer station, a reciprocably mounted dough loading means adjacent said transfer station for receiving said dough sections from said transfer station, a supply conveyor for supplying containers successively to a filling station below said dough loading means, a pneumatic means including a hopper actuator means for causing movement of said dough loading means between said transfer station and a container at said filling station, a circuit means including a switching means for causing said actuation in response to the actuation of said switching means by a dough section when moving from said transfer station to said dough loading means, an indexing means at said filling station and including an indexing actuator means in said pneumatic means for indexing said container means away from said filling station in response to a first condition in which said dough section is delivered to said container means and a second condition in which said dough section is delivered to said container means releasing said switching means.

14. In a dough packaging apparatus the combination including a conveyor means for feeding similar dough sections successively to a transfer station, a reciprocably mounted dough loading means adjacent said transfer station and provided with a vertically extending aperture below the top surface of said conveyor means for receiving said dough sections from said transfer station, a supply conveyor for supplying containers successively to a filling station below said dough loading means, a first switching means connected to a circuit means and associated with said supply means, said switching means actuated by said containers to energize said circuit, a pneumatic means including an actuator means for causing movement of said dough loading means between said transfer station and a container at said filling station to deliver a dough section to said container, a second switching means for causing said actuation in response to the actuation of said second switching means by a dough section when moving from said transfer station to said dough loading means when said first switching means is closed, an indexing means at said filling station for indexing said container away from said filling station and an empty container to said filling station, said indexing means including an indexing actuator means in said pneumatic means for indexing said container means away from said filling station in response to a first and a second condition in which said dough section is delivered to said container and said dough loading means is returned by said hopper actuator means to a position adjacent said transfer station.

15. The device of claim 14 wherein movable means is provided adjacent said indexing means for receiving the filled containers from said indexing means.

16. In a dough packaging apparatus the combination including movable means for feeding similar dough sections successively to a transfer station, a reciprocably mounted dough loading means adjacent said transfer station for receiving said dough sections from said transfer station, a movable means for supplying containers successively to a filling station below said dough loading means, a pneumatic means including a dough loading actuator means for moving said dough loading means between a first position adjacent said transfer station and a second position in filling engagement with a container at said filling station, a first pressure responsive means in said pneumatic means connected to said hopper actuator means, said first pressure responsive means provided with a reciprocal plunger movable between a first and a second position for causing the actuation of said actuator means, an electro-pneumatic valve means in said pneumatic means and connected to said first pressure responsive means for causing movement of said plunger means, a circuit means including a switching means connected to said electro-pneumatic means and actuated in response to a dough section when received at said transfer station by said dough loading means, said actuation causing relative movement of said plunger means and causing said dough loading means to be moved to said second position by said actuator means, an indexing means adjacent said filling station provided with an indexing actuator means, a second pressure responsive means connected to said indexing actuator means and said pneumatic means and provided with a reciprocal plunger means movable between a first and a second position, a first bleed valve means connected to said second pressure responsive means and actuated in response to the movement of said dough loading means to said second position to cause movement of said plunger to said second position, said actuation causing said indexing actuator means to engage a second and a third bleed valve means, said second bleed valve means connected to said second pressure responsive means and maintaining the plunger of said second pressure responsive means in said second position, said third bleed valve means connected to said first pressure responsive means, and causing movement of its plunger means to its first position to return said dough loading means to its first position provided said dough section has entered said container and released said switching means, said movement of said dough loading means releasing said first bleed valve means to cause said indexing means to index the filled container away from said filling station.

17. In a dough packaging apparatus the combination including movable means for feeding similar dough sections successively to a transfer station, reciprocably mounted dough loading means adjacent said transfer station for receiving said dough sections from said transfer station, a movable means for supplying containers successively to a filling station below said dough loading means, a pneumatic means including a dough loading actuator means, a switching means connected to a circuit means and to an electro-pneumatic valving means for causing said actuator means to move said dough loading means between a first position adjacent said transfer station and a second position in filling engagement with a container at said filling station in response to the engagement of said switching means by a dough section when moving from said transfer station to said dough loading means, an indexing means adjacent said filling station and provided with an indexing actuator means, a first valving means in said pneumatic means and actuated by the movement of said dough loading means when moving toward said second position, said actuation preparing said indexing means for indexing, said preparation also causing said indexing actuator means to actuate a second and third valving means in said pneumatic means, said second valving means preventing said indexing means from indexing until said dough loading means is returned to said first position, said third valving means causing said dough loading actuator means to return said dough loading means to said first position provided said dough section has entered said container releasing said switching means and wherein said first valving means causes said indexing means to index the filled container away from said filling station and an empty container to said filling station.

18. A dough packaging apparatus comprising means for supplying similar dough sections successively to a transfer station, a reciprocal dough loading means adjacent said transfer station between said transfer station and a filling station below said transfer station, means for moving containers successively to said filling station, and means for causing vertical movement of said dough loading means between a first position at said transfer station and a second position in engagement with a container at said filling station when a dough section is received by said dough loading means at said transfer station to deliver said dough section to said container.

19. A dough packaging apparatus comprising means for supplying similar dough sections successively to a transfer station a reciprocal dough loading means provided with a vertically extending aperture below and in close proximity with said transfer station, means for moving containers successively to a filling station below the aperture of said dough loading means, and means on said dough loading means for causing vertical movement of said dough loading means between said transfer station and a container at said filling station when a dough section is received in said aperture, and means for stopping said dough loading means abruptly at said container to deliver said dough section through said aperture to the container.

20. In a dough packaging apparatus having means for supplying dough sections successively to a transfer station and means for moving containers successively to a filling station below said transfer station, the improvement including a dough loading means between said transfer station and said filling station, said dough loading means including a supporting frame adjacent said filling station, a reciprocally mounted hopper pivotal on said frame, an actuator means on said frame and connected to said hopper, a vertical aperture extending through said hopper, said aperture having in its end adjacent said container a dimension less than the top outside dimension of said container, and means associated with said actuator means for causing vertical movement of said hopper between a first position in which a dough section is received in said aperture at said transfer station and a second position in which said hopper engages said container and is stopped abruptly to deliver said section through said aperture to said container.

21. A dough packaging apparatus for filling dough sections into containers having filling openings of a cross section closely approximating the cross section of the dough sections, said apparatus comprising means for positioning containers successively at a filling station, a movable dough loading hopper having a dough transfer passage therethrough with a discharge aperture of substantially the same cross section as said container filling openings, operating means for causing relative movement of said hopper between a first position in which said discharge aperture is spaced from said containers while a container is positioned at said station and a second position in which said discharge aperture is in register with the filling opening of a container at said station, and means for feeding similar dough sections successively into said hopper passage when the hopper is in said first position, said operating means including means operable when a dough section has been fed into said hopper passage for moving the hopper rapidly from first to second position thereby moving both the dough section and hopper toward said filling opening, said operating means also including means bringing said hopper to an abrupt stop when its discharge aperture registers with said filling opening and thereby facilitating further movement of the dough section out of said passage and through said aperture into the container.

22. A dough packaging apparatus for filling dough sections into containers having filling openings of a cross section closely approximating the cross section of the dough sections, said apparatus comprising means for positioning containers successively at a filling station with their filling openings facing upwardly, a vertically movable dough loading hopper above said filling station, said hopper having a generally vertical dough transfer passage therethrough with a bottom aperture of substantially the same cross section as said container filling openings, operating means for causing relative vertical movement of said hopper between a first upper position in which said bottom aperture is spaced above said containers while a container is positioned at said station and a second lower position in which said bottom aperture is in register with the filling opening of a container at said station, and means for feeding similar dough sections successively into the top of said hopper passage when the hopper is in said first position, said operating means including control means responsive to feeding of a dough section into said hopper passage and operatively connected to move the hopper from first to second position in response to such feeding, thereby moving both the dough section and hopper toward said filling opening, said operating means also including means bringing said hopper to an abrupt stop when its bottom aperture registers with said filling opening and thereby facilitating further movement of the dough section out of said passage and through said aperture into the container.

References Cited in the file of this patent

UNITED STATES PATENTS

| Re. 22,399 | Fonken | Dec. 7, 1943 |
| 745,018 | Kessler | Nov. 24, 1903 |
| 1,058,865 | Horntuedt | Apr. 15, 1913 |
| 1,312,640 | Mallinckrodt | Aug. 12, 1919 |
| 2,472,073 | Haecks | June 7, 1949 |
| 2,673,672 | Jorgenson | Mar. 30, 1954 |
| 2,686,623 | Wimmer et al. | Aug. 17, 1954 |
| 2,815,623 | Holstolroe et al. | Dec. 10, 1957 |
| 2,893,534 | Sexauer | July 7, 1959 |